United States Patent [19]

Gladish

[11] 4,335,901
[45] Jun. 22, 1982

[54] SUSPENSION OVERRIDE SYSTEM

[75] Inventor: Herbert E. Gladish, Ottawa, Canada

[73] Assignee: E. B. Eddy Forest Products, Ltd., Ottawa, Canada

[21] Appl. No.: 29,848

[22] Filed: Apr. 13, 1979

[30] Foreign Application Priority Data

Jul. 27, 1978 [CA] Canada ................................ 308247

[51] Int. Cl.³ .............................................. B60G 11/26
[52] U.S. Cl. ................................. 280/711; 267/64.28; 280/6 R;714
[58] Field of Search ..................... 280/711, 714, 43.23, 280/6 R, 6 H; 267/65 R, 64.28

[56] References Cited

U.S. PATENT DOCUMENTS

| | | | |
|---|---|---|---|
| 3,104,679 | 9/1963 | Gouirand | 280/711 |
| 3,183,014 | 5/1965 | Doomernik | 280/711 |
| 3,836,166 | 9/1974 | Bainbridge | 280/711 |
| 3,895,816 | 7/1975 | Takahashi | 280/6 H |
| 3,917,295 | 11/1975 | Hiruma | 280/6 H |
| 3,970,327 | 7/1976 | Dezelan | 280/6 H |
| 4,033,423 | 7/1977 | Grosseau | 280/6 H |
| 4,105,216 | 8/1978 | Graham | 280/6 R |
| 4,162,083 | 7/1979 | Zabler | 280/6 H |
| 4,185,845 | 1/1980 | Misch | 280/6 H |

Primary Examiner—Joseph F. Peters, Jr.
Assistant Examiner—John A. Carroll
Attorney, Agent, or Firm—Colton & Stone, Inc.

[57] ABSTRACT

The present invention provides a system for overriding the prior art automatic levelling system for vehicles riding on fluid suspensions such as air bags. Such systems utilize a link extending between the vehicle axle and a regulating valve whereby the valve is responsive to vertical axle movement to alter the pressurization of the air bags and hence the clearance height between the vehicle bed and the axle. In the present invention the link is replaced by a cylinder and piston actuator which is connected to a master control via a conduit. An incompressible fluid fills the actuator chamber, the conduit and the master control chamber. The master control chamber may be varied in volume to produce a corresponding change, via the fluid, in the actuator chamber resulting in relative movement between the actuator cylinder and piston and hence operation of the regulating valve. By appropriately operating the master control it is possible to selectively effect pressurization or bleeding of the air bags to raise or lower the vehicle bed and hence achieve a desired elevation of the vehicle bed relative to a reference elevation. The invention permits rapid adjustment of the vehicle bed elevation to bring it parallel to, for example, the loading dock of a warehouse to speed the loading or unloading process.

38 Claims, 7 Drawing Figures

SUSPENSION OVERRIDE SYSTEM

The present invention relates to control systems for controlling the elevation of a vehicle bed relative to the vehicle axle or a reference elevation and in particular to an override system for selectively altering the clearance height of vehicles having an automatic levelling system.

BACKGROUND OF THE INVENTION

Fluid suspension systems for vehicles are well known and usually include one or more pneumatic springs at each end of each axle whereby the sprung mass of the vehicle (the chassis, body and load) is supported on the unsprung mass (the wheels, suspension, and axles). When dealing with trailers, large trucks or buses it is desirable to maintain the clearance height of the vehicle bed fixed relative to the axle even if the vehicle is not horizontal and the load therein is not centered. It is well known to provide automatic levelling systems which operate to maintain the clearance height. Such systems may include, for each set of air bags, a regulating valve having an arm pivoted thereto and a fixed-length link extending between the arm and the axle. As one end of the axle moves downwardly relative to the vehicle bed, for example, when the vehicle tilts, the link moves downwardly as does the arm on the regulating valve. Such movement of the arm causes the valve to bleed pressurized air from the air bags to effectively lower the vehicle bed to be generally parallel to the axle and hence compensate for downward movement of the axle. Similarly, upward movement of one end of the axle results in increased pressurization of the air bags to effectively raise the vehicle bed to be generally parallel. These alterations in clearance height between the sprung and unsprung masses tend to maintain the sprung mass generally parallel to the unsprung mass even though the unsprung mass moves upwardly or downwardly through a horizontal plane.

It is also desirable to be able to selectively alter the clearance height between the sprung and unsprung masses when the vehicle is stationary, as when a trailer is positioned at a loading dock. A loaded trailer may be lower than the level of the dock and this can hinder the movement of cargo from the vehicle bed to the dock, especially when fork lift trucks are used to remove cargo or when a conveyor may be used to take cargo directly from the vehicle to the dock or vice versa.

This idea is not new in the art, as examplified by U.S. Pat. No. 3,074,739 issued Jan. 22, 1963 to G. Alfieri. In the Alfieri invention a spring biased pneumatic cylinder replaces the link in the automatic systems and may be pressurized at will to override the automatic system. The Alfieri system is complex, expensive and relies on springs and compressed air to operate. Such use reduces the precision control required. This system does not provide tilting control features or feedback control.

SUMMARY OF THE INVENTION

The present invention on the other hand provides a simple, effective and economical system, easily adapted to vehicles provided with automatic levelling systems, and which permits the operator to rapidly bring the vehicle bed to the desired elevation relative to a reference elevation or datum. The system of the present invention is closed and operates essentially independently of the vehicle's compressed air system although that system is used to pressurize the air bags if required.

The operator may stand adjacent the reference elevation, such as a loading dock, and may quickly ascertain the amount by which the clearance height must be altered to achieve the desired elevation.

Three embodiments of the present invention are disclosed herein, each replacing the link of the automatic system with a piston and cylinder type of actuator. The actuator due to small loading requirements is simpler than the Alfieri system in that the piston is not spring biased. The actuator chamber, formed between the piston and the cylinder wall is connected via a conduit to a master control having a variable volume control chamber therein. The two chambers and the conduit are completely filled with an incompressible fluid such as hydraulic fluid.

In the first embodiment each master control (there being one for each side of the vehicle) has a piston located therein, connected via its piston rod to a rotatable knob or handle on the exterior of the master control housing. The knob is threaded to the housing so that rotation of the knob results in advancement or retraction of the piston in the control chamber to alter the volume thereof. Such alteration of volume is translated via the fluid to the actuator which follows with a change in the actuator chamber volume, resulting in movement of the actuator cylinder relative to the piston therein. This movement is received by the arm of the regulating valve with the result that pressurized air is fed into, or bled from, the air bags to raise or lower the vehicle bed as required.

In the second embodiment the master control is positioned at the rear of the vehicle chassis and control thereof is provided by an arm pivotted to the master control housing and the piston rod in the manner of a piston pump. The arm may be telescopic so that it is housed within the vehicle chassis during vehicle travel and is extended outwardly thereof when it is to be used in the override mode. In this embodiment raising or lowering of the arm changes the volume of the master control chamber to thereby cause movement of the actuator and the regulating valve as in the first embodiment to alter the clearance height of the vehicle bed relative to the vehicle axle or the reference elevation. This embodiment lends itself to a feedback system for essentially automatic control of the clearance height once the vehicle bed has been brought to the same elevation as the reference elevation. The free end of the telescopic arm may have means such as a permanent magnet for temporary connection to means establishing the reference elevation so that once the desired clearance height has been set the arm may be connected to those means. Any change in the clearance height occasioned by loading or unloading cargo is reflected in pivotal movement of the arm about its connection point, resulting in movement of the control piston, which in turn results in a raising or lowering of the vehicle bed until its original position, even with the reference elevation, is reached.

If the reference elevation is a loading dock then the permanent magnet, for example, may magnetically connect to a steel plate at the front of the dock. If the reference elevation is itself vertically movable, such as an aircraft or another trailer, the feedback system is operable to compensate for such vertical movement and hence the feedback system is seen to be extremely versatile.

The third embodiment is actually a variation effective with either the first or second embodiments. Each actuator and master control has a double acting piston therein so as to define two chambers, one on each side of the piston. Each piston is provided with a volume compensating rod, of the same diameter as the piston rod, extending in a direction opposite to that of the piston rod thereof. A conduit connects each actuator chamber to the corresponding control chamber and all conduits and chambers are filled with the incompressible fluid. Thus, in the third embodiment a reduction in volume of one control chamber results in an equal increase in volume in the other control chamber, ensured by use of the volume compensating rod. These equal volume changes are translated via the conduits and the fluid into equal, but opposite, volume changes in the corresponding actuator chambers resulting in the desired movement of the actuator cylinder relative to its piston. This system automatically compensates for temperature or other changes in the systems and ensures positive response of the actuator to input at the master control.

In summary of the above, the present invention may be broadly defined as providing in a system for altering the clearance height between sprung and unsprung masses of a vehicle, the vehicle being provided on each side thereof with fluid spring means positioned between the masses and regulating valve means for altering the fluid pressure in the spring means, the improvement in means for selectively altering the clearance height to achieve a desired elevation of the sprung mass relative to a reference elevation comprising for each side of the vehicle: actuator means comprising an actuator cylinder, an actuator member reciprocal therein so as to define an actuator chamber within the cylinder, and an actuator rod connected to the actuator member extending outwardly of the actuator cylinder; means connecting one end of the actuator means to the regulating valve means and the other end to the unsprung mass; master control means remote from the actuator means and having a control chamber therein; control means operative to alter the volume of said control chamber; flexible conduit means interconnecting the actuator chamber and the control chamber; and a generally incompressible fluid completely filling the conduit means, the actuator chamber and the control chamber; whereby upon operation of the control means, a change in volume of the control chamber is translated via the fluid into a change in volume of the actuator chamber resulting in movement of the actuator cylinder relative to the actuator member, such movement actuating the regulating valve means to alter the fluid pressure in the fluid spring means to thereby alter the clearance height.

DESCRIPTION OF THE PREFERRED EMBODIMENT

Figure 1:
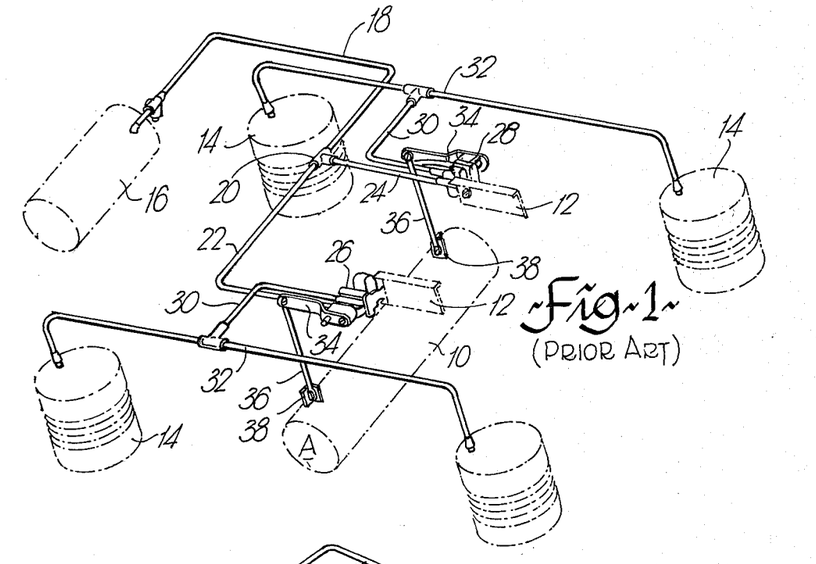
FIG. 1 illustrates schematically a prior art automatic levelling system for vehicles utilizing a pneumatic suspension.

Before describing the present invention in detail, reference will be made to FIG. 1 which depicts the environment in which the present invention is operative. FIG. 1 illustrates schematically a common prior art system for providing for automatic levelling of a vehicle chassis or at least maintaining a set clearance height between the chassis and the axle.

In FIG. 1 the vehicle axle representing the unsprung mass is depicted by reference number 10 and the vehicle chassis by reference number 12, representing the chassis rails and the sprung mass. As is common in the art a plurality of fluid spring means such as pneumatic spring means 14, i.e. air bags, are provided between the chassis and the axle and when inflated they will support the load of, and on, the chassis. The manner of connecting the air bag springs to the chassis and axle need not be described herein as it does not form a part of the present invention and it is already well known. Similarly it is not deemed necessary to show the air bag springs in detail.

An air reservoir 16 supplied by an engine-driven compressor is connected via conduit 18 to a junction 20 and hence via conduits 22 and 24 to regulating valves 26 and 28, each being attached to the chassis rails, one for each side of the vehicle. Each valve is, in turn connected to the air bag springs via conduits 30, 32.

Each regulating valve is intended to feed compressed air to, or to bleed compressed air from, the air bag springs to maintain the clearance height between the chassis and the axle and hence to maintain the chassis generally parallel to the axle even if the loading is not centered. This is accomplished by providing each valve with an arm 34 pivotally connected thereto, the arm being connected to the axle via a fixed link 36 and brackets 38. Should for example, the clearance height of the left end A of axle 10 increase with respect to the chassis or axle, arm 34 of the left hand valve 26 would be drawn down by link 36 and the valve would operate to bleed compressed air from the left hand air bag springs to decrease the clearance height between the chassis and the axle and hence effectively maintain the chassis generally parallel to the axle. Similarly, if the clearance height should decrease relative to the chassis or axle the arm 34 of the respective valve 26, 28 would raise and the valve would feed air to the air bag springs to effectively increase the clearance height between the chassis and the axle and hence keep the chassis generally parallel to the axle.

As indicated previously the above system is used mainly on trailers for keeping the chassis transversely level with uneven loading. It could be used also on buses or other such vehicles to maintain the chassis longitudinally level as well.

It is often desirable to selectively alter the clearance height of a vehicle and, as indicated hereinbefore, this is especially desirable when loading or unloading a vehicle at a warehouse dock. Hence an override of the automatic levelling system becomes desirable since the vehicle is already provided with means to effect changes in the clearance height, albeit automatically.

Turning now to FIGS. 2 to 7 the present invention, which relates to a simple yet effective means for selectively varying the clearance height, will now be described.

Figure 2:
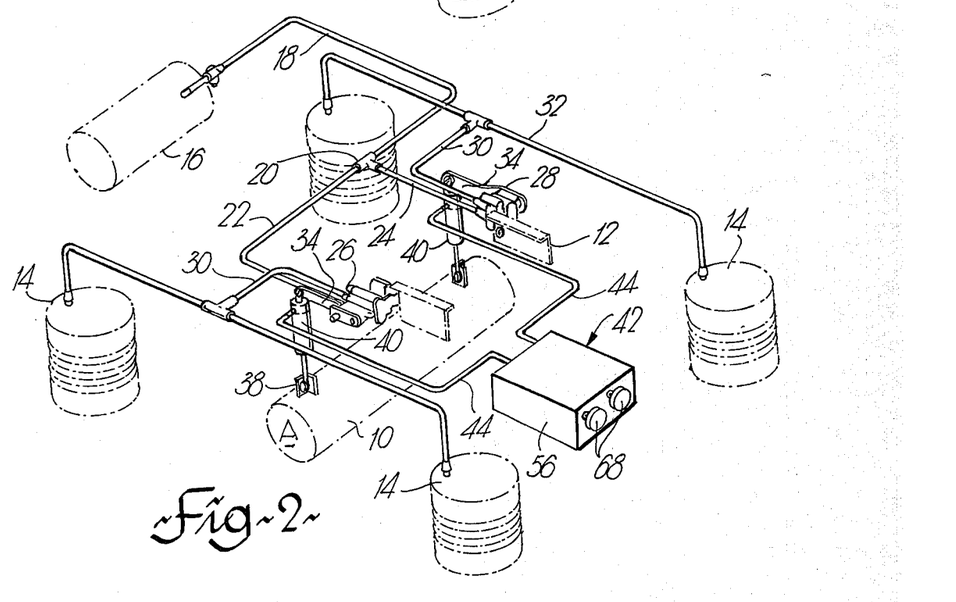
FIG. 2 is similar to FIG. 1 and shows schematically one embodiment of the present invention.

As illustrated in FIG. 2 the links 36 of the prior art are replaced by actuator means 40, to be described in greater detail hereinafter. Remote master control means 42 are provided so as to be readily accessible by an operator, preferably adjacent the rear of the vehicle so that the operator may readily judge the difference between the vehicle elevation and a reference elevation such as the height of a loading dock. Each actuator means is connected to the remote master control means by a conduit 44.

Figure 3:
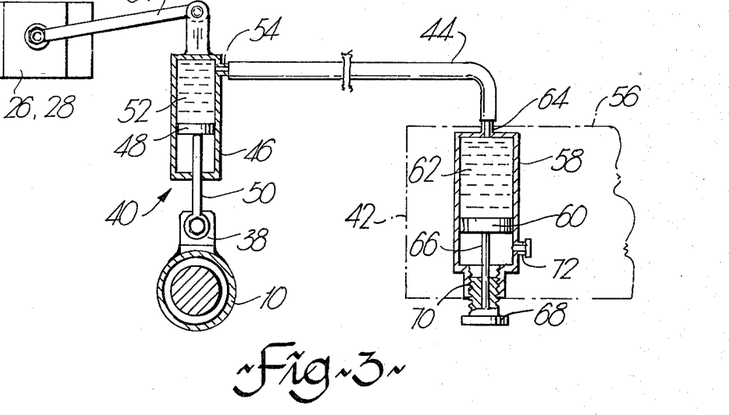
FIG. 3 is a partial cross-section of the operating components of the embodiment shown in FIG. 2.

FIG. 3 illustrates the basic system of FIG. 2 in greater detail. It is seen therein that each actuator means 40 includes an actuator cylinder 46 with an actuator member such as piston 48 sealingly slidably received therein and connected to a piston rod 50. One end of the actuator means 40 such as the cylinder 46 is pivotally connected to the arm 34 of a valve 26, 28 and the other end, such as the rod 50 is connected to the bracket 38 on the axle housing 10. The piston 48 and cylinder 46 define therebetween an actuator chamber 52 having but a single outlet 54.

The conduit 44 leads from outlet 54 at one end thereof to the remote master control means 42 contained in a housing 56, the master conrol means including a control cylinder or control housing 58 having a control piston 60 sealingly slidably received therein so as to define a control chamber 62 having but a single outlet 64 to which is attached the other end of conduit 44. Piston 60 has a control piston rod 66 passing through the end of housing 58 remote from outlet 64 and terminating in control means such as a rotatable knob or handle 68 affixed thereto. Knob 68 is positioned outside the housing 56 and may have suitable indicia thereon to indicate its relative position with respect to housing 56. The shank of knob 68 is threaded as to 70 to cooperate with corresponding threads on the cylinder 58 so that rotation of knob 68 will result in advancement or retreat of piston 60 within the chamber 62 to thereby alter the volume thereof. The cylinder 58 may be provided with a vent opening 72 therein on the side of piston 60 remote from chamber 62.

Chamber 62, conduit 44 and chamber 52 are all charged so as to be completely filled with a generally incompressible fluid, such as hydraulic fluid so as to establish an essentially constant volume of fluid in this closed system.

When it is desired to raise or lower the vehicle bed to align it with a reference elevation, for example, with a loading dock, the vehicle is first backed up to a position adjacent the dock. The master control means 42 is positioned at the back of the vehicle so that the operator may readily observe the relative elevations of the vehicle bed and the loading dock. The operator then operates the knobs 68 in order to raise or lower the vehicle bed to bring the bed to the same elevation as the dock. As he rotates a knob 68 the control piston 60 will advance or retreat in the control chamber 62 to change the volume thereof. If for example the volume of chamber 62 is reduced by advancing piston 60 therein the force of such advancement will act on the incompressible fluid such that the result is a force acting on actuator piston 48 of actuator means 40 tending to move the actuator piston 48 out of the cylinder 46. Since the vehicle axle is stationary in a vertical plane the actual effect is the raising of cylinder 46 and hence the raising of arm 34 of the corresponding regulating valve 26. Thus the regulating valve reacts as though the bed were level and the axle were raised and hence it will permit pressurized air to be fed to the associated pneumatic springs thereby raising the vehicle bed. Similarly if the knob 68 is rotated in the opposite direction to enlarge chamber 62, the hydraulic fluid will flow to fill the enlarged control chamber and such flow will lower the pressure of fluid in the actuator chamber 52 resulting in movement of cylinder 50 towards piston 48 to stabilize the volume of the system. This has the effect of moving rod 34 downwardly and the regulating valve reacts by decreasing the pressure in the associated pneumatic springs resulting in a lowering of the vehicle bed.

The housing 58 for the master control means 42 may be provided with suitable indicia indicating the direction of movement of the knobs 68 required to achieve the desired movement of the vehicle bed. Clearly the right and left valve means are independent of each other since it may be necessary to alter the clearance height by different amounts on each side of the vehicle.

It is also clear that since the actuator means 40, conduit 44 and master control means 42 operate as a closed loop and that since the fluid therein is essentially incompressible, the operation of the prior art automatic levelling system is not altered by the provision of the invention on the vehicle. The actuator means 40 acts in the same manner as the prior art link 36 and it operates to override the automatic system only in response to operation of the master control means 42. Also the actuator means 40 acts as a small shock absorber link to effectively cushion the linkage and thus reduce connecting point wear during travelling periods.

Figures 4, 5:
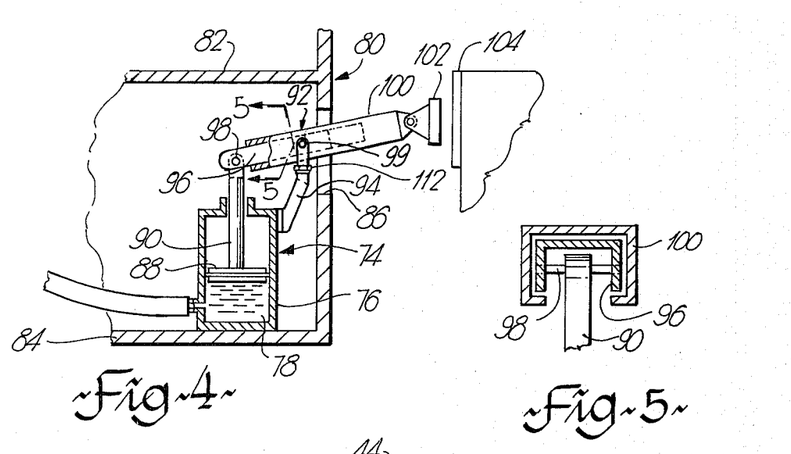
FIG. 4 shows a portion of a second embodiment of the present invention.
FIG. 5 is a cross-section on the line 5—5 of FIG. 4.

A further development of the present invention is illustrated in FIGS. 4 and 5. This embodiment utilizes the actuator means 40 and conduit 44 of FIGS. 2 and 3 but provides a different master control means 74. With this embodiment the master control means 74 includes a control cylinder or housing 76 defining a variable volume control chamber 78 therein. A control cylinder 76 is positioned on each side of the vehicle body 80 towards the rear. An opening 86 is provided in the rear face of the vehicle. A control piston 88 is sealingly slidably received in control cylinder 76 and the control piston rod 90 thereof extends upwardly from the control cylinder to be pivotally connected to one end of an arm 92. Intermediate its ends arm 92 is pivotally connected to a bracket 94 attached to control cylinder 76. As seen in FIG. 5 in greater detail arm 92 is of composite construction. It includes an inner channel portion 96 to which piston rod 90 and bracket 94 are pivotally connected as by pivot pins 98 and 99 respectively. An outer C-shaped arm portion 100 is slidably or telescopically received on channel portion 96 longitudinally thereof and is so dimensioned that its free end can be moved from a position within the vehicle chassis to an extended position projecting through opening 86 as shown in FIG. 4.

The free end of arm portion 100 carries an attachment member 102 pivotally connected thereto. Member 102 may be a permanent magnet, a hook, an adhesive or any other material which can be seen to provide at least a temporary lock with the dock. Assuming member 102 to be a permanent magnet, the dock should have means for establishing the reference elevation such as a metallic ferromagnetic face 104. If the reference elevation is provided by a vertically movable body, such as an aircraft, then an appropriate attachment member may be utilized. In fact the attachment member may be removably connected to the arm portion 100 as by a bolt, so that the appropriate type of attachment member may be pivotally connected to the arm portion 100.

In operation the vehicle is backed up to the dock as before. The operator then goes to one side of the vehicle and withdraws the telescopic arm portion 100 from its stored location within the vehicle chassis. By moving arm portion 100, and hence arm 92, upwardly or downwardly, he can alter the volume of control chamber 78 and the fluid therein will transmit the required force to the actuator means to result in a raising or lowering of the vehicle bed. This is repeated for the other side of the vehicle and the vehicle bed may be levelled with the dock.

This embodiment provides an additional advantage over the first embodiment in that once the desired level has been set the members 102 are connected to the loading dock, as by a magnetic connection, and this provides a fixed datum or reference elevation for the override system. Should the vehicle level change with respect to the dock during loading, or unloading, such movement will be transmitted to the override system via the arm 92 being fixed at one end to the dock. Thus if the vehicle level falls the movement has the effect of moving piston 88 to reduce control chamber 78, increasing the volume of actuator chamber 52, raising rod 34 and causing valve 26 or 28 to pressurize the pneumatic springs until the vehicle bed is raised again to the level of the dock. In effect this embodiment provides a self-correcting override system using the principles of feedback to maintain the vehicle bed level with the dock once the setting has been first achieved by the operator.

Figure 6:
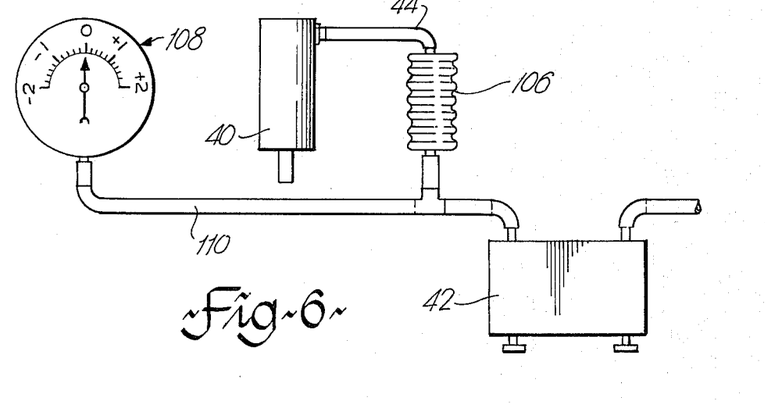
FIG. 6 shows two optional variations of the present invention.

Two optional features which may be included with the present invention are illustrated in FIG. 6. In the event that the system is to be used in a climate where there are great temperature variations, as in the northern United States, or Canada, it may be desirous to provide compensation for expansion or contraction of the working fluid resulting from temperature extremes. This could be provided, for example, by including in conduit 44 a section 106 of corrugated tubing in the form of a bellows and having a temperature coefficient of expansion similar to that of the fluid so that the bellows section 106 expands or contracts at the same rate as the fluid. Thus expansion or contraction of the fluid will not affect the elevation of the vehicle bed with respect to the axle or the reference elevation.

The other optional feature shown in FIG. 6 is a remote indicator indicated by reference number 108. It may be a normal pressure gauge with a central null point indicative of a stable condition in the system, connected to the conduit 44 by conduit 110. The indicator 108 will show momentary movement, either positive or negative, upon initial movement of the knob 68 or the arm 92. The indicator will fall back to the null point as the system stabilizes, indicating that the actuator means has responded to the input of the valve means 42 or 74. Failure of the indicator 108 to fall back to the null point would signal the operator that there is a problem in the system.

Another optional feature is shown in FIG. 4, being an adjustment means 112 contained in bracket 94. The adjustment means could, for example, be a simple turnbuckle positioned between appropriately threaded portions of a split bracket 94. Operation of the adjustment means 112 would raise or lower the free end of arm portion 100 to align the attachment member 102 with the means 104 for establishing the reference elevation.

Thus, if the vehicle loading does not permit initial mating of the attachment member 102 with element 104, the adjusting means may be operated to achieve proper mating.

Figure 7:
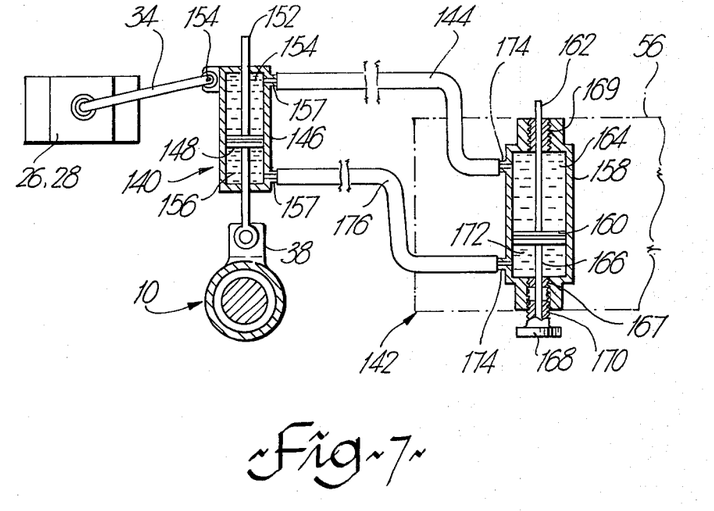
FIG. 7 illustrates in partial cross-section the operating components of the third embodiment of the present invention.

Yet another optional construction is shown in FIG. 7, this construction being usable in either the first embodiment or the second embodiment, with or without the other optional features. This construction utilizes double acting actuator means and double acting master control means which automatically compensate for temperature changes while providing more positive and precise piston movements and positioning.

As seen in FIG. 7, the actuator means 140 includes an actuator cylinder 146 with an actuator member such as piston 148 sealingly slidably received therein and connected on one side to a piston rod 150 which sealingly extends outwardly of cylinder 146. A volume compensating rod 152, having the same diameter as piston rod 150 sealingly extends outwardly of cylinder 146 from piston 148 in a direction opposite to that of piston rod 150. One end of actuator means 140, such as cylinder 146 is pivotally connected to the arm 34 of a valve 26, 28 as at 153 and the other end, such as rod 150, is connected to the bracket 38 on the axle housing 10. The piston 148 defines a pair of actuator chambers 154 and 156, one on each side thereof, each member having an outlet 157.

The master control means 142 is contained in housing 56 and includes a control cylinder or housing 158 with a control piston 160 sealingly slidably received therein. One side of piston 160 is connected to a control piston rod 166 which extends outwardly of cylinder 158 through a seal 167 to be connected to a control means such as knob 168. Knob 168 is threadedly cooperable with threads 170 on cylinder 158 so that rotation of knob 168 will result in advancement or retreat of piston 160 within cylinder 158.

A control volume compensating rod 162 having the same diameter as piston rod 166 extends outwardly of cylinder 158 through a seal 169 from piston 160 in a direction opposite to that of piston rod 166. The end of cylinder 158 through which rod 162 extends is shaped to have the same configuration as the end through which rod 166 extends so that volume changes in the two control chambers 164, 172 formed on each side of piston 160 will be equal, although opposite in sense. Each chamber 164, 172 has an outlet 174 therein.

A flexible conduit 144 interconnects the outlets 157, 174 of the chambers 154 and 164 respectively and a flexible conduit 176 interconnects the outlets 157, 174 of the chambers 156 and 172 respectively. Chambers 154, 164 and conduit 144 are filled with incompressible fluid as are chambers 156, 172 and conduit 176 although there is no interconnection between the two chamber and conduit systems.

The operation of this optional construction is the same as for the first embodiment described. However, any temperature changes are automatically compensated and by having the double acting arrangement the movement of actuator piston is more positive since movement of control piston 160 in either direction results in a positive force being applied to the actuator piston 148.

By using the volume compensating rod 152 and 162 it is seen that a change in volume of either actuator chamber or either control chamber results in an equal change in the other actuator chamber or control chamber respectively, one change being an increase in volume and the other change being an equal decrease in volume. This of course keeps the overall system in balance.

While the optional construction has been described with particular reference to the first embodiment it is readily seen that the second embodiment could be altered in the same manner.

The above description is intended to describe the best modes of carrying out the present invention but it is understood that other variations therein could be effected by a skilled practitioner in the art without departing from the spirit of the invention. Accordingly the scope of protection to be afforded the present invention should be primarily determined from the appended claims.

The embodiments of the invention in which an exclusive property or privilege is claimed are defined as follows:

1. In a system for altering the clearance height between sprung and unsprung masses of a vehicle being provided on each side thereof with fluid spring means positioned between said masses and regulating valve means for altering the fluid pressure in said fluid spring means, the improvement in means for manually selectively altering said clearance height to achieve a desired elevation of the sprung mass relative to a reference elevation comprising, for each side of said vehicle:

actuator means for said regulating valve means comprising an actuator cylinder, an actuator member reciprocal therein so as to define an actuator chamber within said cylinder, and an actuator rod connected to said actuator member extending outwardly of said actuator cylinder;

means connecting one end of said actuator means to said regulating valve means and the other end to said unsprung mass;

master control means remote from said actuator means and having a control chamber therein;

operator actuable control means operative to alter the volume of said control chamber;

flexible conduit means interconnecting said actuator chamber and said control chamber; and a generally incompressible fluid completely filling said conduit means, said actuator chamber and said control chamber;

whereby upon operation of said control means, a change in volume of said control chamber is translated via said fluid into a change in volume of said actuator chamber resulting in movement of said actuator cylinder relative to said actuator member, such movement actuating said regulating valve means to alter the fluid pressure in said fluid spring means and thereby alter said clearance height.

2. The improvement of claim 1 wherein said sprung mass includes a vehicle chassis and a vehicle load-carrying bed, said unsprung mass includes a vehicle axle, and each said regulating valve means includes a regulating arm thereon, said regulating arm being connected to said one end of said associated actuator means.

3. The improvement of claim 2 wherein said actuator cylinder is connected to said regulating arm and said actuator rod is connected to said axle.

4. The improvement of claim 3 wherein said master control means includes a housing having a control piston sealingly slidably received therein to define a control chamber within said housing, a control piston rod connected to said control piston and extending outwardly of said housing and said control means is connected to said control piston rod for imparting reciprocal movement to said control piston to alter the volume of said control chamber.

5. The improvement of claim 3 wherein said actuator member defines a pair of actuator chambers, one on each side thereof, there being a volume compensating rod connected to said actuator member extending outwardly of said actuator cylinder in a direction opposite to that of said actuator rod; said master control means includes a housing having a control piston sealingly slidably received therein to define a pair of control piston; a control piston rod is connected to said control piston and extends outwardly of said housing; a control volume compensating rod is connected to said control piston and extends outwardly of said housing in a direction opposite to that of said control piston rod; said control means is connected to said control piston rod for imparting reciprocal movement to said control piston to equally alter the volume of each said control chambers; and there is a pair of conduits, each connecting an actuator chamber with a corresponding control chamber.

6. The improvement of claim 4 wherein said control means includes a knob fixedly attached to said control piston rod and threadedly connected to said housing whereby rotation of said knob imparts said reciprocal movement to said control piston.

7. The improvement of claim 4 wherein said control means includes a control arm pivotally connected at one end to said control piston rod and pivotally connected intermediate its ends to said housing, whereby pivotal movement of the other end of said control arm about the connection to said housing imparts said reciprocal movement to said control piston via said control piston rod.

8. The improvement of claim 7 wherein said control arm includes a first channel shaped portion having said pivotal connections thereon, and a second C-shaped portion telescopically enveloping said first portion longitudinally thereof whereby said second portion may be extended relative to said first portion when said control chamber volume is to be altered.

9. The improvement of claim 8 wherein said other end of said control arm is on said second portion and wherein an attachment member is pivotally connected to said other end of said control arm to at least temporarily connect said other end of said control arm to means establishing said reference elevation.

10. The improvement of claim 5 wherein said control means includes a control arm pivotally connected at one end to said control piston rod and pivotally connected intermediate its ends to said housing, whereby pivotal movement of the other end of said control arm about the connection to said housing imparts said reciprocal movement to said control piston via said control piston rod.

11. The improvement of claim 10 wherein said control arm includes a first channel shaped portion having said pivotal connections thereon, and a second C-shaped portion telescopically enveloping said first portion longitudinally thereof whereby said second portion may be extended relative to said first portion when said control chamber volume is to be altered.

12. The improvement of claim 11 wherein said other end of said control arm is on said second portion and wherein an attachment member is pivotally connected to said other end of said control arm to at least temporarily connect said other end of said control arm to means establishing said reference elevation.

13. The improvement of claim 9 wherein said attachment member is a permanent magnet.

14. The improvement of claim 9 wherein the pivotal connection between said control arm and said housing is adjustable.

15. The improvement of claim 1 and including temperature compensating means in said conduit means.

16. The improvement of claim 15 wherein said temperature compensating means includes a corrugated metal conduit section having a temperature coefficient of expansion similar to that of said fluid.

17. The improvement of claim 1 and including a pressure responsive indicator connected to said conduit means, said indicator including a null point to indicate pressure stability in said chambers and said conduit means.

18. In a wheeled vehicle having a vehicle body defining a vehicle bed and an axle carrying wheels, the vehicle having for each side thereof fluid spring means positioned between said body and said axle and a regulating valve for varying the fluid pressure in said spring means, the improvement in means for manually selectively altering the clearance height between said body and said axle to achieve a desired elevation of the vehicle body relative to a reference elevation comprising, for each side of said vehicle:
- actuator means for said regulating valve including an actuator cylinder connected to said regulating valve, a piston sealingly slidably received in said cylinder to define an actuator chamber in said cylinder and a piston rod extending from said piston to be connected to said axle;
- a master control remote from said actuator means, said master control including a control cylinder, a control piston sealingly slidably received in said control cylinder to define a control member in said control cylinder, and a control piston rod extending outwardly of said control cylinder;
- operable actuable control means connected to said control piston rod for imparting reciprocal movement to said control piston to alter the volume of said control chamber;
- a flexible conduit interconnecting said control chamber and said actuator chamber; and
- hydraulic fluid completely filling said conduit and said chambers; whereby upon operation of said master control, a change in volume of said control chamber is translated via said fluid into a change in volume of said actuator chamber resulting in movement of said actuator cylinder relative to said actuator piston, such movement actuating said regulating valve to alter the fluid pressure in said fluid spring means and to thereby alter said clearance height.

19. The improvement of claim 18 wherein said regulating valve includes a regulating arm pivotally connected at one end thereto, said actuator cylinder being pivotally connected to the other end of said regulating arm.

20. The improvement of claim 19 wherein said actuator piston defines a pair of actuator chambers, one on each side thereof, there being a volume compensating rod connected to said actuator piston extending outwardly of said actuator cylinder in a direction opposite to that of said chambers, one on each side of said control piston; a control volume compensating rod is connected to said control piston and extends outwardly of said control cylinder in a direction opposite to that of said control piston rod; and there is a pair of said conduits, each connecting an actuator chamber with a corresponding control chamber.

21. The improvement of claim 19 wherein said control means includes a knob fixedly attached to said control piston rod and threadedly connected to said control cylinder whereby rotation of said knob imparts said reciprocal movement to said control piston to alter said control chamber volume.

22. The improvement of claim 19 wherein said control means includes a control arm pivotally connected at one end to said control piston rod and pivotally connected intermediate its ends to said control cylinder, whereby pivotal movement of the other end thereof about the connection to said control cylinder imparts said reciprocal movement to said control piston via said control piston rod to alter said control chamber volume.

23. The improvement of claim 22 wherein said control arm includes a first channel portion having said pivotal connections thereon, and a second C-shaped portion telescopically enveloping said first portion longitudinally thereof whereby said second portion may be extended relative to said first portion when said control chamber volume is to be altered.

24. The improvement of claim 23 wherein said other end of said control arm is on said second portion and wherein an attachment member is pivotally connected to said other end of said control arm to at least temporarily connect said other end of said control arm to means establishing said reference elevation.

25. The improvement of claim 20 wherein said control means includes a control arm pivotally connected at one end to said control piston rod and pivotally connected intermediate its ends to said control cylinder, whereby pivotal movement of the other end thereof about the connection to said control cylinder imparts said reciprocal movement to said control piston via said control piston rod to alter said control chamber volume.

26. The improvement of claim 25 wherein said control arm includes a first channel shaped portion having said pivotal connections thereon, and a second C-shaped portion telescopically enveloping said first portion longitudinally thereof whereby said second portion may be extended relative to said first portion when said control chamber volume is to be altered.

27. The improvement of claim 26 wherein said other end of said control arm is on said second portion and wherein an attachment member is pivotally connected to said other end of said control arm to at least temporarily connect said other end of said control arm to means establishing said reference elevation.

28. The improvement of claim 24 wherein said attachment member is a permanent magnet.

29. The improvement of claim 24 wherein the pivotal connection between said control arm and said control cylinder is adjustable.

30. The improvement of claim 18 and including temperature compensating means in said conduit.

31. The improvement of claim 30 wherein said temperature compensating means includes a corrugated metal conduit section having a temperature coefficient of expansion similar to that of said fluid.

32. The improvement of claim 18 and including a pressure responsive indicator connected to said conduit, said indicator including a null point to indicate pressure stability in said chambers and said conduit.

33. The improvement of claim 5 wherein said control means includes a knob fixedly attached to said control piston rod and threadedly connected to said housing whereby rotation of said knob imparts said reciprocal movement to said control piston.

34. The improvement of claim 12 wherein said attachment member is a permanent magnet.

35. The improvement of claim 12 wherein the pivotal connection between said control arm and said housing is adjustable.

36. The improvement of claim 20 wherein said control means includes a knob fixedly attached to said control piston rod and threadedly connected to said control cylinder whereby rotation of said knob imparts said reciprocal movement to said control piston to alter said control chamber volume.

37. The improvement of claim 27 wherein said attachment member is a permanent magnet.

38. The improvement of claim 27 wherein the pivotal connection between said control arm and said control cylinder is adjustable.

* * * * *